United States Patent [19]

Leandris

[11] 4,276,996

[45] Jul. 7, 1981

[54] DEVICE FOR FEEDING A WORK STATION WITH A SERIES OF ARTICLES, PARTICULARLY ELECTRIC WIRES, IN A PREDETERMINED ORDER

[75] Inventor: Serge Leandris, Saint Sauveur, France

[73] Assignee: Precision Mecanique Labinal, France

[21] Appl. No.: 78,799

[22] Filed: Sep. 25, 1979

[30] Foreign Application Priority Data

Sep. 28, 1978 [FR] France ............................ 78 27855
Jan. 18, 1979 [FR] France ............................ 79 01287

[51] Int. Cl.³ ............................ B65G 61/00

[52] U.S. Cl. ............................ 221/87; 221/238; 221/112; 198/341

[58] Field of Search ............................ 221/79, 80, 81, 87, 221/88, 238, 112–118; 198/341, 448

[56] References Cited

U.S. PATENT DOCUMENTS 2,548,786 4/1951 Harney ............................ 221/87 X
3,545,647 12/1970 Bowdey ............................ 221/81

*Primary Examiner*—Allen N. Knowles
*Attorney, Agent, or Firm*—Ostrolenk, Faber, Gerb & Soffen

[57] ABSTRACT

The device comprises (FIGS. 1 and 2) a fixed plate 1 provided with radial paths 2 having axes 3; along each path there is disposed an assembly 4 which comprises a wire-holder with a wire guide 10 for the wire 12 and means for moving this wire-holder radially. The paths having axes a, b, c, d, e, f converge at A, those having axes h, i, j, k, l, m at B and that having axis g passes through C without passing through A or B.

In a variation, the device (FIGS. 3 to 7) has a common delivery zone for each of the article-holders. Each article-holder comprises, in addition to a stopping position for taking up and a delivery position, a third stopping position for waiting which is located between these two above-mentioned stopping positions, in the vicinity of the delivery position.

20 Claims, 7 Drawing Figures

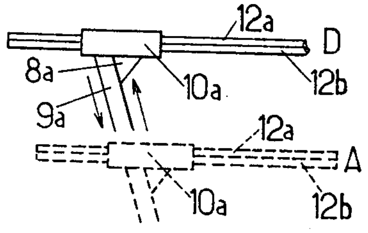
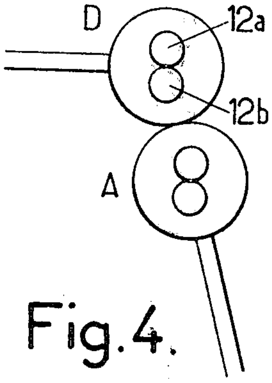
Fig.3.
Fig.4.
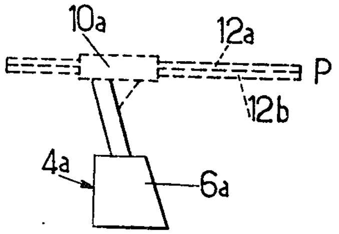
Fig.5.
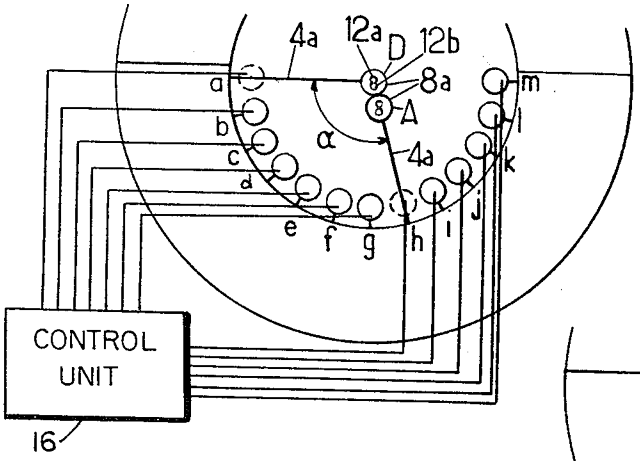
Fig.6.
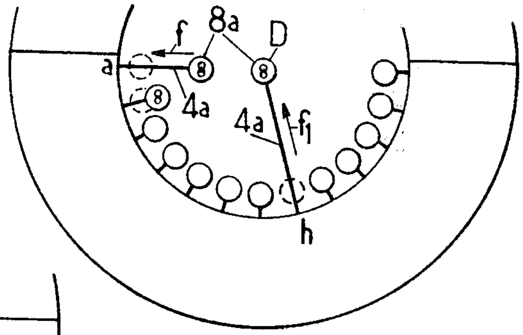
Fig.7.
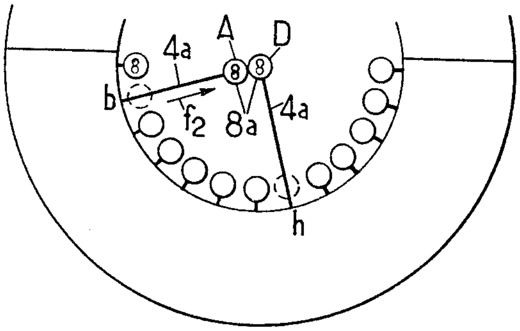

DEVICE FOR FEEDING A WORK STATION WITH A SERIES OF ARTICLES, PARTICULARLY ELECTRIC WIRES, IN A PREDETERMINED ORDER

The invention relates to supplying a work station with a certain number of articles in a predetermined order.

It applies more particularly to supplying an automatic machine for manufacturing cabling from a large number of different electric wires (different in section, nature or colour).

Supply devices made from electric wires are at present known for supplying by means of identical wires or a very small number of different wires (generally two wires) the work station, disposed downstream, of a machine for cutting and fitting electric wires.

Moreover, French Pat. No. 2,030,925, filed on Dec. 22, 1969 by the company *KABEL UND METALLWERKE GUTEHOFFNUNGSHUTTE AKTIENGESELLSCHAFT* and whose granting was published on Nov. 13, 1970, describes a device for manufacturing bundles of conductors for multi-bundle telecommunication cables, in which a spool for winding the bundle draws each of the basic elements (strands of electric conductors or groups of strands of electric conductors) successively through a special eyehole assigned to this element and through an eyehole common to the assembly of elements of the bundle, the special eyeholes being carried by slides disposed along the radii of a circle and driven successively in alternating translation to bring the eyeholes to the centre of the circle and in a position removed from the centre, each of these special eyeholes reaching successively this single central position.

On the other hand, the present invention provides a device which may supply a large number of electric wires, for example thirteen wires, all different if necessary, in a predetermined order, to a subsequent work station in a machine for cutting or manufacturing cabling.

The device of the invention is characterized by the fact that it comprises—in conjunction with n article feeders and with a work station for receiving series of articles each comprising up to n articles having to reach it in a predetermined order—, in combination, n mobile article-holders, n moving means adapted to move each of these n article-holders between a taking-up position in which it can take up an article from one of the n feeders and a delivery position, the delivery positions being all situated in the same limited zone, control means for actuating in a predetermined order each of these n moving means so that it moves the associated article-holder from the taking-up position to the delivery position, then, after a predetermined time, from the delivery position to the taking-up position, and taking-up means for taking up the articles successively present in said limited zone and to supply them to said work station.

When the n articles are formed by n electric wires, possibly all different, the n mobile article-holders are formed by n wire-holders comprising a wire guide through which an electric wire can pass.

In a first series of embodiments:

when n is even, the delivery positions merge at a first point for (n/2) article-holders or wire-holders and at a second point for the (n/2) other article-holders or wire-holders;

when n is uneven, the delivery positions merge at a first point for (n−1/2) article-holders or wire-holders, and merge at a second point for (n−1/2) other article-holders or wire-holders, the delivery position being disposed, for the last article-holder or wire-holder, at a third point adjacent, but distinct from, the two others.

In a preferred embodiment of this first series, the device comprises, in combination, a fixed plate comprising n substantially radial paths, a workpiece disposed along each path and carrying a mobile article-holder or wire-holder in relation to this workpiece and adapted to move in the direction of the corresponding path, moving means adapted to actuate each article-holder or object-holder to move it between its taking-up position and its delivery position in said direction of the corresponding path and grasping means adapted to take up an article or wire in place in an article-holder or object-holder present in said zone.

If n is even (n/2) paths converge at a first point and the (n/2) other paths converge at a second point, adjacent to the first.

If n is uneven, (n−1/2) paths converge at a first point, (n−1/2) other paths converge at a second point, adjacent to the first, and the axis of the first path passes through a point, adjacent to the other two points, without passing through these two points.

Preferably the control means are actuated so that said moving means bring into said predetermined zone an article or wire in place in the article-holder or wire-holder which it actuates, whereas said grasping means take up an article or wire disposed in another article-holder or wire-holder, the two article-holders or wire-holders cooperating with paths whose axes do not pass through the same delivery point.

In a second series of embodiments, so as to be able to profit from the advantage of stopping an article, particularly a wire, before it is taken up, an advantage which allows a rapid work rate to be obtained, it is provided for each article-holder to have, in addition to the taking-up position and the delivery position, an intermediate waiting position disposed in the vicinity of the delivery position.

For this purpose, the device for supplying a work station with a series of articles in a predetermined order, comprises effectively—in conjunction with n article feeders and with a work station for receiving a series of articles each comprising up to n articles having to reach it in a predetermined order—, in combination, n mobile article-holders, n moving means adapted to move each of these n article-holders between a taking-up position in which it can take up an article from one of the n feeders and a delivery position, the delivery positions being all situated in the same limited zone, control means for actuating in a predetermined order each of these n moving means so that it moves the associated article-holder from the taking-up position to the delivery position, then, after a predetermined period of time, from the delivery position to the taking-up position, and grasping means for taking up the articles successively present in said limited zone and supplying them to said work station, whereas, on the one hand, said zone is limited to a common delivery zone for each of n article-holders and, on the other hand, each of said article-holders comprises, in addition to the taking-up and delivery stopped positions, a third waiting stopped position which is located between these two above-mentioned stopped positions in the vicinity of the delivery position.

Preferably, the waiting position is situated so that the article, particularly the electric wire, occupying the waiting position, is in the immediate vicinity of the article, particularly the electric wire, in the delivery position.

Furthermore, also preferably, the n article-holders are actuated successively in such an order that the axis of movement of the article-holder in the waiting position forms with the axis of movement of the article-holder in the delivery position an angle at least equal to approximately 75°, so as to allow each of these two article-holders to move without hindering the movement of the other of these two article-holders.

The invention also provides for the possibility of handling two articles, particularly two electric wires, simultaneously, and for this purpose the article-holders are constructed so as to be able to take up in the taking-up position and so as to be able to move, at first in the waiting position and then in the delivery position, a pair of articles, particularly electric wires; of course, as a variation, the possibility of handling simultaneously three or even more than three articles or electric wires at one and the same time could be provided.

The invention will, in any case, be well understood with the help of the complement of description which follows, as well as the accompanying drawings, which complement and drawings are, of course, given particularly by way of indication.

FIG. 3 shows, in side elevation, one of the article-holders of the device according to the second series of embodiments of the invention, in its three stopped positions, i.e. its taking-up position, its waiting position and its delivery position (the first two being shown by a broken line).

FIG. 4 illustrates, in an end view, the article-holder of FIG. 3 in its waiting and delivery positions, with two wires handled simultaneously.

FIGS. 5, 6 and 7 show three successive positions of three article-holders of a device according to FIG. 3.

With the intention of constructing a device for feeding a work station with a series of articles, particularly electric wires, in a predetermined order, the following or similar is the way to set about it.

Figure 1:
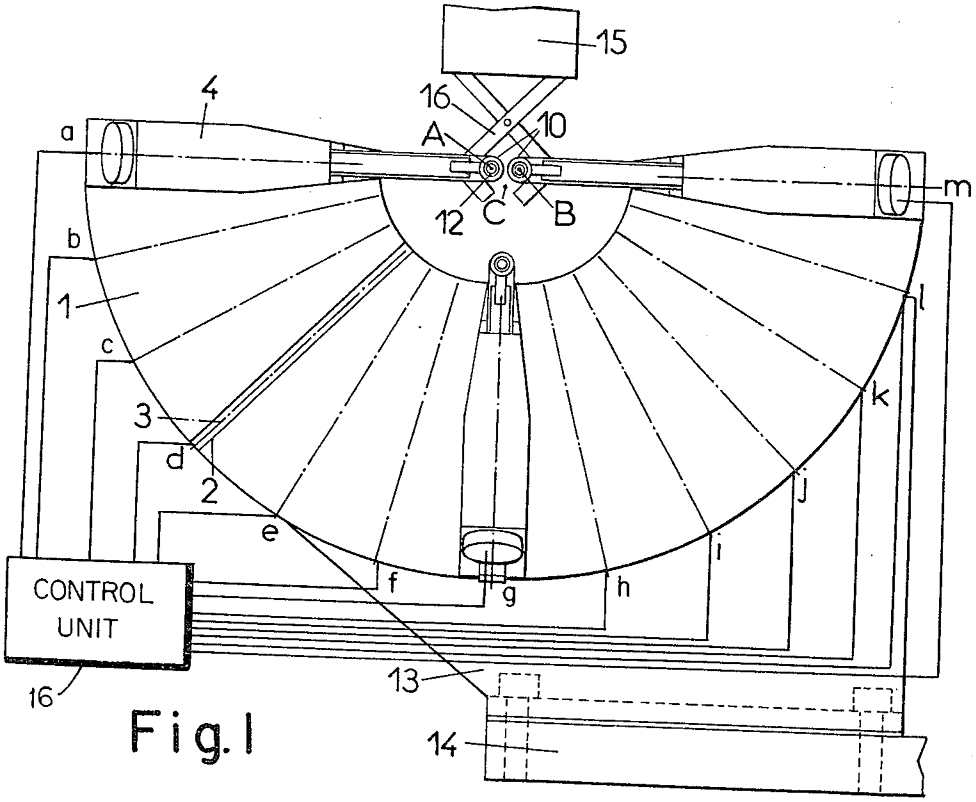
FIG. 1 shows, in side elevation, a device for feeding a work station with a series of electric wires in a predetermined order, constructed in accordance with the first series of embodiments of the invention.

FIG. 1 shows a device for feeding a work station with a succession of electric wires up to thirteen electric wires (n=13) in a predetermined order, these wires being all different.

In the embodiment of this figure, the device comprises a fixed plate 1, for example in the form of a circular half-ring, provided with thirteen radial paths or grooves 2 (only one of which is shown), having axes 3 disposed substantially along radii of the circular half-ring.

Figure 2:
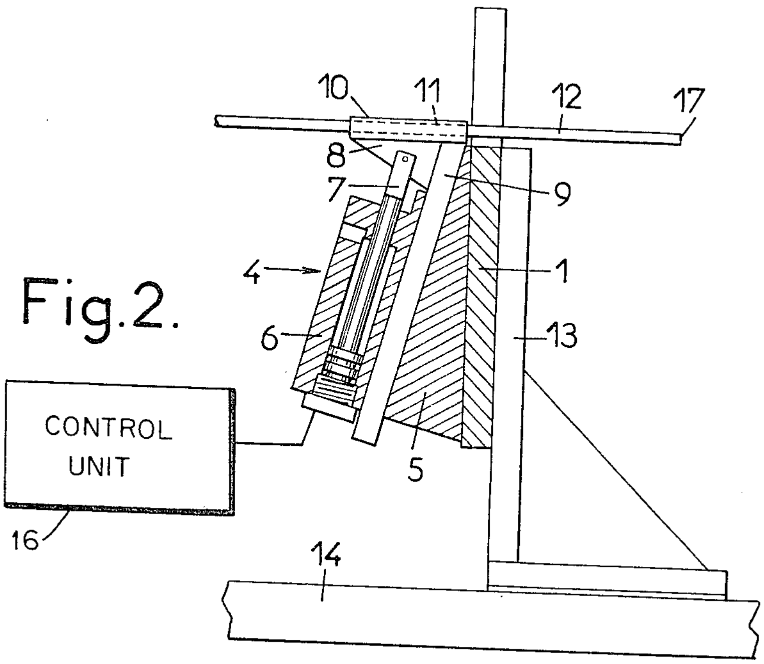
FIG. 2 is a sectional view of one of the wire-holders and means for moving same, the wire-holder and these means being in position on the device of FIG. 1.

In each groove 2 there is disposed an assembly illustrated in section in FIG. 2; there are accordingly thirteen assemblies 4 (only three of which have been shown in FIG. 1). Each of these assemblies 4 comprises (FIG. 2) a piece or wedge 5 housed in a groove 2 and fixed to plate 1; each wedge 5 carries a pneumatic micro-jack 6 whose mobile rod 7 acts on the wire-holder 8. This latter comprises, on the one hand, a square section shaft 9 which slides in a square section bore of wedge 5 and, on the other hand, a cylindrical part 10 having a cylindrical bore 11 therethrough, part 10 forming a guide for wire 12. Bore 11 has a section slightly greater than the section of the largest sectioned wire to be handled.

Plate 1 is carried by an upright 13 fixed to base 14.

Finally the device comprises nippers 15 with two mobile jaws 16.

In FIG. 1 the successive letters a, b, c, d, e, f, g, h, i, j, k, l, m designate the thirteen axes 3, in a counterclockwise direction. The six axes a to f converge at a first point A; the six axes h to m converge at a second point B, whereas axis g passes through a third point C adjacent to A and B, axis g passing neither through A nor through B.

The movement of parts 10, forming wire guides, takes place between a taking-up position (which is that shown for wire guide 10 of axis g) and a deliver position (which is shown for the wire guide 10 of axes a and m). It will be noted that the delivery position for the wire guide of axis g corresponds to point C.

In accordance with an important feature of the invention, the delivery positions—here at A, B and C—of the wire guides are all situated in a limited zone in which operate the jaws 16 of nippers 15.

The device of FIGS. 1 and 2 cooperates with means, disposed upstream, to feed a large number of wires, up to thirteen, which may be all different in section, nature or colour, and with a handling station disposed downstream of the device and which is to receive a succession of series of wires each formed by thirteen wires reaching it in a predetermined order.

The operation of the device of FIGS. 1 and 2 is the following.

Each operational wire guide 10 (whose number depends on the number of wires in a series) is first of all in the taking-up position which is that illustrated for the guide wire of axis g; in this position it is supplied with a wire from wire-supplying means. Under the action of the associated jack 6, the wire guide is brought forward to the delivery position which is that illustrated for the wire guides of axes a and m. In this position, nippers 15 close and the arms 16 thereof pull the ends 17 of wire 12 to bring it to the downstream station in which it will be handled.

During the operation of nippers 15, a second wire guide 10 is actuated in the same way and goes from the taking-up position to the delivery position, which allows a very rapid work rate to be obtained. When this second wire guide is in the delivery position, the taking up, by nippers 15, of the wire which was in the first wire guide is finished and the jack 6 associated with this first wire guide brings this wire guide to its taking-up position. At this time a third wire guide 10 may be brought from its taking-up position to the delivery position by its associated jack 6.

There will now be explained the order for controlling jacks 6 and so for moving wire guides 10, while taking into account the fact of the convergence of the axes of grooves 2 at points A, B and C (actually a single groove passes through C).

Because, so as to increase the rate, two wire guides 10 may be at the same time in the delivery position, these two wire guides must necessarily correspond to non-converging grooves. Therefore jacks corresponding to axes which converge at A and at B will be alternately actuated, the jack corresponding to axis g which passes through point C only being actuated if the number of wires to be handled is uneven.

To better understand the succession for actuating the jacks, we will take, by way of example, two simple particular cases, i.e. a first case in which the number n of electric wires to be handled is even (n=4) and a second case in which this number n is uneven (n=5).

First case: n=4

The four wires to be handled successively are disposed in wire guides 10 corresponding to the axes of a, m, b and l. Jacks 6 will operate in the following order:

| | |
|---|---|
| first cycle | (wire 1 in wire guide of axis a, f.p.A |
| | ) wire 2 in wire guide of axis m, f.p.B |
| | (wire 3 in wire guide of axis b, f.p.A |
| | ) wire 4 in wire guide of axis l, f.p.B |
| second cycle | (wire 1 in wire guide of axis a, f.p.A |
| | ) wire 2 in wire guide of axis m, f.p.B |
| | (.......................... |

(f.p. = final delivery position of the wire guide).

Second case: n=5

The five wires to be handled successively are disposed in the wire guides 10 corresponding to the axes of grooves a, m, b, l, g. Jacks 6 will operate in the following order:

| | |
|---|---|
| first cycle | (wire 1 in wire guide of axis a, f.p.A |
| | ) wire 2 in wire guide of axis m, f.p.B |
| | (wire 3 in wire guide of axis b, f.p.A |
| | ) wire 4 in wire guide of axis l, f.p.B |
| | (wire 5 in wire guide of axis g, f.p.C |
| second cycle | (wire 1 in wire guide of axis a, f.p.A |
| | ) wire 2 in wire guide of axis m, f.p.B |
| | (.......................... |

In the first case it can be seen that a left-hand jack (moving a wire guide towards A) and a right-hand jack (moving a wire guide towards B), considering FIG. 1, are actuated successively; the wire guides 10 will occupy the delivery position centred on A for wire guides having axes a and b and on B for wire guides having axes m and l. Two successive wire guides may always be in the delivery position, one at position A and the other at position B.

In the case where n is uneven (case where n=5), the fifth (and last) jack actuated in each cycle is the jack which corresponds to axis g, the corresponding wire guide arriving at position C, and therefore the successive wire guides will come into the following delivery positions: A, B, A, B, C in each cycle. In the following cycle there will be at the beginning a wire guide at position A than at B. Thus it can be seen that two successively actuated wire guides never come into the same position, among the three positions A, B and C. A third position of type C is only necessary if an uneven number of wires is to be handled. For an even number of wires, two positions, such as A and B, are sufficient for wire guides 10.

Of course, it is necessary for nippers 15 to be able to take up, by means of its jaws 16, wires present either at position A, or at position B, or finally at position C if there is an uneven number of wires. This is why, in accordance with an important feature of the invention, these three positions A, B, C are adjacent.

The successive operation of jacks 6 takes place according to a predetermined programme which depends, on the one hand, on the number of wires and, on the other hand, on the order in which the wires are to be handled to form a group or cable, i.e. on the order in which these wires are to be handled in the work station downstream of the device of the invention. For example, jacks 6 are actuated by means of electric control pulses from a central control member or central unit 16 forming a programmable automation (indicated schematically in FIGS. 1–3).

In the second series of embodiments (FIGS. 3 to 7), the article-holders are organized and move as in the case of the first series (FIGS. 1 and 2), apart from the modifications mentioned below and which relate to:

the oneness of the delivery point for the different article-holders, the existence, for each article-holder, of a waiting position between the taking-up position and the delivery position, the waiting position being preferably in the immediate vicinity of the delivery position, the possibility, for each article-holder, to move more than one article or electric wire, particularly two articles or electric wires.

With reference first of all to FIGS. 3 and 4, it can be seen, in this embodiment, each moving means **4*a* may move, through shaft 9*a*, an article-holder 8*a* which comprises a cylindrical part 10*a* adapted to grasp and transport a pair of electric wires 12*a* and 12*b*; the members for controlling, or means for moving, article-holder 8*a*, shown schematically by a pneumatic jack 6*a*, the structure of the assembly 4*a*–8*a* being similar to that illustrated in FIG. 2, except for the fact that cylindrical part 10*a* comprises a bore adapted to carry two wires 12*a* and 12*b*. In FIGS. 3 and 4 there is shown the existence of a waiting position A in addition to the delivery position D and the taking-up position P, for cylindrical part 10 (waiting position A and taking-up position P are illustrated with a broken line in FIG. 3**).

Of course the possibility illustrated in FIGS. 3 and 4, for cylindrical part **10*a*, to grasp two electric wires 12*a* and 12*b* is not essential to the invention, part 10*a* being able to take up either a single electric wire or other article, oe more than two electric wires or other articles, the essential feature being the existence of a waiting position and, as will be seen later on, the oneness of the delivery position for the whole of article-holders 8*a*, which will be explained hereafter with reference to FIGS. 5 to 7**, to which reference will now be made.

In FIG. 5 there are shown moving means **4*a* and article-holders 8*a*** adapted to be moved along axes a and h, the first in the delivery position D and the second in waiting position A.

It will be noted that, as in FIG. 1, the successive letters a, b, c, d, e, f, g, h, i, j, k, l and m designate the thirteen axes along which the different article-holders **8*a* may move; however, whereas in the case of the embodiment of FIGS. 1 and 2, these thirteen axes converge at three points (A, B and C according to FIG. 1), according to the embodiment of FIGS. 3 to 7 the thirteen axes converge at a single point corresponding to delivery position D which is the sole one for the thirteen article-holders 8*a***.

In FIG. 6 there is shown article-holder **8*a* moving along axis a during its movement between the delivery position and the taking up position and the article-holder along axis h in the delivery position, whereas finally in FIG. 7** the article-holder along axis h is in the delivery position and the article-holder along axis b is in the waiting position. The operation of the device of FIGS. 3 to 7 is the following, with reference to FIGS. 5 to 7.

Initially the thirteen article-holders 8*a* occupy their taking-up position which is that illustrated by a circle shown either with a continuous line for axes b to g and i to m, or by a broken line for axes a and h (FIG. 5). It is assumed that it is first of all the article-holder along axis a which takes up the first pair of wires (or possibly a single wire or more than two wires) and which moves to finally occupy the position shown in FIG. 5, i.e. delivery position D; then it is the article-holder along axis h which takes up a pair of wires (or possible a single wire or more than two wires) in the taking-up position and the corresponding jack 6*a* brings this article-holder to the waiting position A against the delivery position D of the article-holder 8*a* along axis a. We then find the position shown in FIG. 5.

Once the delivery has been made by the article-holder 8*a* along axis a, this article-holder moves in the direction of arrow f, as illustrated in FIG. 6, towards the taking-up position; meanwhile, the article-holder 8*a* along axis h moves in the direction of arrow $f_1$ to go from the waiting position to the delivery position D. We then find at a given moment the situation illustrated in FIG. 6, before the article-holder of axis a comes back to its taking-up position.

Then it is for example the article-holder along axis b which moves in the direction of arrow $f_2$ to take up the waiting position A illustrated in FIG. 7, the wire or wires carried by the article-holder 8*a* along axis b coming into the vicinity of the wire or wires carried by the article-holder 8*a* along axis h which are in delivery position D, as shown in FIG. 7. Then, after delivery of the wire or wires carried by the article-holder 8*a* along axis h, this article-holder moves from the delivery position towards the taking-up position and the article-holder along axis b will take up the delivery position.

We see then, in short, that each article-holder 8*a* goes successively from its taking-up position in which it takes up one or more wires or other articles to its waiting position, then to its delivery position in which it delivers the wire or wires or other articles, then comes back again to its taking-up position. Since the waiting position is very close to the delivery position, the time necessary for going from the waiting position to the taking-up position, for the article-holder and so for the wire or wires or other articles, is very short, which allows substantially the same rate to be obtained as the device of FIGS. 1 and 2, while having, which is an advantage, a single delivery point.

So as to avoid any possible risk of jamming of one article-holder by another, it is arranged that the angle formed by the axes of two article-holders 8*a* actuated successively is at least equal to 75°, this value of 75° corresponding to five steps, the step being the angle between two successive axes; for example between axis a and axis b the step is of the order of 15° when thirteen article-holders 8*a* are provided.

It will be readily understood, as has already been explained several times, that the number of wires or other articles taken up and delivered may differ from two, the article-holder able to be constructed moreover to take up selectively one, two or more than two articles and that the construction of the article-holder may be such as illustrated in FIG. 2 or even different.

Insofar as the movement of the article-holder 8*a* is concerned, the device may comprise, as in the case of FIG. 2, a fixed plate comprising n substantially radial paths, a part disposed along each path and carrying an article-holder or wire-holder mobile in relation to this part and adapted to move in the direction of the corresponding path, moving means adapted to actuate each article-holder or wire-holder to move same between its waiting and taking-up positions (in accordance with the present invention) and its delivery position along the direction of the corresponding path.

As is evident and as it follows moreover already from what has gone before, the invention is in nowise limited to those of its modes of application and embodiments which have been more specially considered; it embraces, on the contrary, all variations thereof.

For example:

the device of the invention could handle articles other than electric wires;

jacks 6 could be replaced by other moving means, such as cams or levers;

nippers 15 could be replaced by other grasping means, such as serrated rollers;

the distribution of the paths or grooves 2 could be other than on a semi-circular plate 1.

I claim:

1. A device for supplying a work station with a series of articles in a predetermined order, said device comprising:

n mobile article-holders adapted to receive articles fed to them, n being an even integer greater than 1;

n moving means each adapted to move a respective said article-holder between a respective taking-up position and one of two delivery positions, said two delivery positions being in a predetermined zone; (n/2) of said article-holders being movable between their respective said taking-up positions and one of said delivery positions, and the remaining (n/2) said article-holders being movable between their respective said taking-up positions and the other said delivery position;

control means for actuating in a predetermined order each said moving means to move the corresponding said article-holder from its said taking-up position to its said delivery position and then, after a predetermined time, to move it back from its said delivery position to its said taking-up position; and taking-up means for taking up the articles successively in said zone in the sequence in which they are moved thereto by said article-holders, and for supplying the articles to a work station.

2. A device for supplying a work station with a series of articles in a predetermined order, said device comprising:

n mobile article-holders adapted to receive articles fed to them, n being an odd integer greater than one;

n moving means each adapted to move a respective one of said n article-holders between a respective take-up position and one of three delivery positions, said delivery positions all being in a predetermined zone; (n−1)/2 of said article-holders being movable between their respective said taking-up positions and one said delivery position, an additional (n−1)/2 of said article holders being movable between their respective said taking-up positions and a second said delivery position, and the remaining said article-holder being movable between its said taking up position and the third said delivery position;

control means for actuating in a predetermined order each said moving means to move the corresponding said article-holder from its said taking-up position to its said delivery position and then, after a predetermined time, to move it back from its said delivery position to its said taking-up position; and taking-up means for taking up the articles successively in said zone in the sequence in which they are moved thereto by said article-holders, and for supplying the articles to a work station.

3. A device according to claim either of claims 1 or 2, characterized by the fact that the n article-holders are wire-holders comprising a wire guide through which can pass an electric wire.

4. A device according to either of claims 1 or 2, wherein said control means comprises a programmable automaton.

5. A device for supplying a work station with a series of articles in a predetermined order, said device comprising:

n mobile article-holders adapted to receive articles fed to them, n being an integer greater than 1;

n moving means each adapted to move a respective said article-holder between a respective taking-up position and a respective delivery position;

control means for actuating in a predetermined order each said moving means to move the corresponding said article-holder from its said taking-up position to its said delivery position and then, after a predetermined time, to move it back from its said delivery position to its said taking-up position;

taking-up means for taking up the articles successively in said zone in the sequence in which they are moved thereto by said article-holders, and for supplying the articles to a work station;

a fixed plate comprising means defining n paths which generally converge toward said delivery position and having a respective part disposed along each said path, each said part having a respective said article-holder disposed thereon and adapted to move relative thereto along the corresponding said path;

each said moving means being adapted to move the corresponding said article-holder between its respective said taking-up position and its respective said delivery position along the corresponding said path; and said taking-up means comprising grasping means adapted to take up an article which has been moved into said zone by one of said article holders.

6. A device according to claim 5, wherein n is even, and wherein said zone includes two said delivery positions; (n/2) of said article-holders being movable between their respective said taking-up positions and one said delivery position, and the remaining (n/2) said article-holders being movable between their respective said taking-up positions and the other said delivery position.

7. A device according to claim 6, characterized by the fact that ($n_2$) said paths converge at a first delivery point and the (n/2) other said paths converge at a second delivery point, adjacent to said first delivery point.

8. A device according to claim 5, wherein n is odd, and wherein said zone contains three delivery positions, (n−1)/2 of said article-holders being movable between the corresponding said taking-up position and a first said delivery position, an additional (n−1)/2 of said article-holders being movable between the corresponding said taking-up position and a second said delivery position, and the remaining said article-holder being movable between its said taking-up position and the third said delivery position.

9. A device according to any one of claims 5, 6 or 8, characterized by the fact that said control means actuates said moving means in such a manner that said moving means brings into said predetermined zone the corresponding said article-holder while said grasping means is taking up an article disposed in another said article-holder, the two article-holders or wire-holders corresponding to ones of said paths whose axes do not pass through the same said delivery point.

10. A device according to claim 8, characterized by the fact that (n−1)/2 paths converge at a first delivery point, (n−1)/2 other paths converge at a second delivery point, adjacent to said first delivery point, and the axis of the last path passes through a third delivery point, adjacent to said first and second delivery points, without passing through said first or said second delivery point.

11. A device according to claim 5, wherein said control means comprises a programmable automaton.

12. A device for supplying a work station with a series of articles in a predetermined order, said device comprising:

n mobile article-holders adapted to receive articles fed to them, n being an integer greater than 1;

n moving means each adapted to move a respective one of said article-holders between a respective taking-up position, a respective waiting position and a delivery position; each said waiting position being located between the corresponding said taking-up position and said delivery position;

control means for actuating in a predetermined order each said moving means to move the corresponding said article-holder from its said taking-up position to said delivery position and then, after a predetermined time, to move it back from said delivery position to its said taking-up position; and taking-up means for taking up the articles successively from said delivery position in the sequence in which they are moved thereto by means of said article-holders, and for supplying the articles to a work station.

13. A device according to claim 12, characterized by the fact that each said waiting position is situated in the immediate vicinity of the corresponding said delivery position.

14. A device according to either of claims 13 or 12, characterized by the fact that it comprises a fixed plate comprising means defining n substantially radial paths, a part disposed along each said path and carrying a respective said article-holder mobile in relation to the corresponding said part and adapted to move along the corresponding said path, respective moving means adapted to move each said article-holder along the corresponding said path between its said taking-up position, its said waiting position and said delivery position.

15. A device according to claim 14, characterized by the fact that n article-holders are actuated successively in an order such that the axis of movement of the article-holder which is in its said waiting position at a given time forms with the axis of movement of the article-holder which is in said delivery position at the same time an angle at least equal to approximately 75°, so as to allow each of these two article-holders to move without hindering the movement of the other of these two article-holders.

16. A device according to claim 12, characterized by the fact that said article-holders are each adapted to hold a pair of articles.

17. A device according to claim 12 characterized by the fact that said control means comprises a programmable automaton.

18. A device according to claim 16, wherein said article-holders are wire-holders.

19. A device for supplying a work station with a series of articles in a predetermined order, said device comprising:

n mobile article-holders adapted to receive articles fed to them, n being an integer greater than 1;

n moving means each adapted to move a respective one of said article-holders between a repective taking-up position and a respective delivery position, said delivery positions being in a predetermined zone; said moving means being adapted to move each of said article-holders independently of movement of the other said article-holders;

control means for actuating in a predetermined order each said moving means to move the corresponding said article-holder from its said taking-up position and to its said delivery position and then, after a predetermined time, to move it back from its said delivery position to its said taking-up position; and taking-up means for taking up the articles successively in said zone in the sequence in which they are moved thereto by said article-holders, and for supplying the articles to a work station.

20. A device according to claim 19, wherein said moving means are adapted to move said article-holders by means of reciprocating motion.

* * * * *

UNITED STATES PATENT AND TRADEMARK OFFICE
CERTIFICATE OF CORRECTION

PATENT NO. : 4,276,996

DATED : July 7, 1981

INVENTOR(S) : Serge Leandris, Saint Sauveur, France

It is certified that error appears in the above-identified patent and that said Letters Patent are hereby corrected as shown below:

Column 1, at [75], please amend inventor's name to read as follows:

--Inventor: Sergio Leandris, Saint Sauveur, France--

Column 9, line 27, after "position" insert: --, said delivery positions being located in a predetermined zone;--

Column 10, line 62, please amend Claim 15 to read as follows:

15. (Amended) A device according to claim 14, characterized by the fact that each said article-holder has an axis of movement, and that said article-holders are actuated successively in an order such that [the] said axis of movement of the article-holder which is in its said waiting position at a given time forms with [the] said axis of movement of the article-holder which is in said delivery position at the same time an angle [at least equal to] not less than

UNITED STATES PATENT AND TRADEMARK OFFICE

CERTIFICATE OF CORRECTION

PATENT NO. : 4,276,996

DATED : July 7, 1981

INVENTOR(S) : Serge Leandris, Saint Sauveur, France

It is certified that error appears in the above-identified patent and that said Letters Patent are hereby corrected as shown below:

approximately 75°, so as to allow each of these two article-holders to move without hindering the movement of the other of these two article-holders.

Signed and Sealed this

*Thirteenth* Day of *October 1981*

[SEAL]

*Attest:*

GERALD J. MOSSINGHOFF

*Attesting Officer* *Commissioner of Patents and Trademarks*